United States Patent
Wang et al.

(10) Patent No.: US 10,702,774 B2
(45) Date of Patent: Jul. 7, 2020

(54) INFORMATION PROCESSING METHOD, APPARATUS, ELECTRONIC DEVICE AND STORAGE MEDIUM

(71) Applicant: NETEASE (HANGZHOU) NETWORK CO., LTD., Hangzhou (CN)

(72) Inventors: Junxiang Wang, Hangzhou (CN); Zhaoda He, Hangzhou (CN)

(73) Assignee: NETEASE (HANGZHOU) NETWORK CO., LTD., Hangzhou, Zhejiang (CN)

(*) Notice: Subject to any disclaimer, the term of this patent is extended or adjusted under 35 U.S.C. 154(b) by 0 days.

(21) Appl. No.: 16/145,187

(22) Filed: Sep. 28, 2018

(65) Prior Publication Data
US 2019/0091570 A1    Mar. 28, 2019

(30) Foreign Application Priority Data
Sep. 28, 2017   (CN) .......................... 2017 1 0899062

(51) Int. Cl.
*A63F 13/42*     (2014.01)
*G06F 3/0488*    (2013.01)
(Continued)

(52) U.S. Cl.
CPC .............. *A63F 13/42* (2014.09); *A63F 13/52* (2014.09); *G06F 3/04845* (2013.01);
(Continued)

(58) Field of Classification Search
CPC .......... A63F 13/10; A63F 13/40; A63F 13/42; A63F 13/45; A63F 13/52; A63F 13/55
See application file for complete search history.

(56) References Cited

U.S. PATENT DOCUMENTS

| 8,840,466 B2 | 9/2014 | Kareemi et al. |
| 2011/0285636 A1* | 11/2011 | Howard ............. G06F 3/04815 345/173 |

(Continued)

FOREIGN PATENT DOCUMENTS

| CN | 1763702 A | 4/2006 |
| CN | 102012739 A | 4/2011 |

(Continued)

OTHER PUBLICATIONS

The CN1OA issued by CNIPA dated Jul. 18, 2018.
(Continued)

*Primary Examiner* — Omkar A Deodhar
(74) *Attorney, Agent, or Firm* — Yunling Ren

(57) ABSTRACT

An information processing method, implemented by a mobile terminal including a touch display and rendering a graphic user interface on the touch display, content presented on the graphic user interface at least including a game scene, includes: when a sliding operation acting on a touch operation area is detected, controlling a visual field movement of the game scene on the graphic user interface according to the movement of the touch point of the sliding operation; and when it is detected that the touch point of the sliding operation enters a preset boundary area, acquiring the first sliding direction of the touch point entering the preset boundary area, and controlling, when the touch point is located in the preset boundary area, the visual field movement of the game scene on the graphic user interface according to the first sliding direction. incoherent.

18 Claims, 10 Drawing Sheets

Control, when a sliding operation acting on a touch operation area is detected, a visual field movement of the game scene on the graphic user interface according to the movement of the touch point of the sliding operation — S110

Acquire, when the touch point of the sliding operation entering a preset boundary area is detected, the first sliding direction of the touch point entering the preset boundary area, and control, when the touch point is located in the preset boundary area, the visual field movement of the game scene in the graphical user interface according to the first sliding direction — S130

(51) Int. Cl.
*A63F 13/52* (2014.01)
*G06F 3/0484* (2013.01)
(52) U.S. Cl.
CPC .. *G06F 3/04883* (2013.01); *A63F 2300/1075* (2013.01); *A63F 2300/308* (2013.01)

(56) References Cited

U.S. PATENT DOCUMENTS

2012/0309478 A1* 12/2012 Kotsugai ............... A63F 13/426
463/3
2017/0364210 A1* 12/2017 Zhang ..................... G06F 9/46

FOREIGN PATENT DOCUMENTS

| CN | 103513763 A | 1/2014 |
| CN | 104978142 A | 10/2015 |
| CN | 105389119 A | 3/2016 |
| CN | 105597310 A | 5/2016 |
| CN | 106774907 A | 5/2017 |
| CN | 107132981 A | 9/2017 |
| CN | 107203321 A | 9/2017 |

OTHER PUBLICATIONS

How to set front view when sliding screen in King GloryTM? May 6, 2017.
Tutorial of moving view in King GloryTM! Released on Nov. 17, 2016.
Advanced operation skills in King GloryTM: Vision expanded by 100% using a four-finger operation. Time: Jun. 12, 2017.

* cited by examiner

INFORMATION PROCESSING METHOD, APPARATUS, ELECTRONIC DEVICE AND STORAGE MEDIUM

CROSS REFERENCE

This application is based upon and claims priority to Chinese Patent Application No. 201710899062.4, filed on Sep. 28, 2017 the entire contents thereof are incorporated herein by reference.

TECHNICAL FIELD

The present disclosure relates to the field of gaming technologies, and more particularly, to an information processing method, device, electronic device and storage medium.

BACKGROUND

With the development of mobile intelligent terminals and the game industry, a large number of mobile games with different themes are emerged to serve the needs of users. Multiplayer playing games by a team is the core gameplay of many mobile games. For example, the most core gameplay of the Multiplayer Online Battle Arena (MOBA) type of mobile games is a 5V5 teambattle. In the process of players teambattles, it is important to view battle situation of a game scene in real time. Therefore, whether it is possible to provide a convenient and quick interaction mechanism for viewing visual field is an important factor in the user experience of such mobile games.

In the case of ensuring that a left-hand controls the move of the left joystick, the view of the panoramic visual field is limited in the MOBA type of mobile games. In the related art, the interaction mechanism for viewing visual field mainly includes the following three aspects.

First, a mini-map is provided in upper left corner of a graphic user interface, and the visual field of the game scene is viewed by dragging and dropping within the scope of the small map. Since the MOBA type of mobile games usually adopts a left joystick, the scheme cannot make players to view the visual field while controlling a movement of a virtual character.

Second, a small map is provided in upper right corner of a graphic user interface, and a movement of a game scene is realized by dragging and dropping within the scope of the small map, but the small map on the right side blocks the information of the game scene and the signal information.

Third, a visual field is viewed by dragging, dropping and mapping a right-handed joystick. When the joystick is dragged to the edge of the screen, if the position players want to view is not reached, the virtual character is controlled to move in that direction, or the visual field is dragged again.

In view of the above problems, no effective solution has been proposed yet.

It should be noted that the information disclosed in this section above is only for enhancement of understanding of the background of the present disclosure, and thus may include information that does not constitute prior art related art known to those of ordinary skill in the art.

SUMMARY

At least one embodiment of the present disclosure provides an information processing method, apparatus, device, and storage medium.

According to an embodiment of the present disclosure, there is provided an information processing method, wherein a software application is executed on a processor of a mobile terminal and a graphic user interface is rendered to a touch display of the mobile terminal, and the content rendered by the graphic user interface at least partially includes a game scene, the method includes following steps:

when a sliding operation acting on a touch operation area is detected, a visual field movement of the game scene on the graphic user interface is controlled according to the movement of the touch point of the sliding operation; and when the touch point of the sliding operation entering a preset boundary area is detected, the first sliding direction of the touch point entering the preset boundary area is acquired, and when the touch point is located in the preset boundary area, the visual field movement of the game scene on the graphic user interface is controlled according to the first sliding direction.

In an embodiment of the present disclosure, there is provided an information processing apparatus, wherein a software application is executed on a processor of a mobile terminal and a graphic user interface is rendered to a touch display of the mobile terminal, and the content rendered by the graphic user interface at least partially includes a game scene, which includes:

a first interactive unit, configured to control a visual field movement of the game scene on the graphic user interface according to the movement of the touch point of the sliding operation upon detecting a sliding operation acting on a touch operation area;
and a second interactive unit, configured to acquire the first sliding direction of the touch point entering the preset boundary area upon detecting that the touch point of the sliding operation enters a preset boundary area, and control, when the touch point is located in the preset boundary area, the visual field movement of the game scene on the graphic user interface according to the first sliding direction.

In an embodiment of the present disclosure, there is provided a computer readable storage medium which stores a computer program, wherein the computer program is executed by a processor to implement the information processing method according to any one of the information processing method.

The above general description and the following detailed description are merely illustrative and illustrative and are not restrictive.

BRIEF DESCRIPTION OF THE DRAWINGS

The drawings described herein are provided to provide a further understanding of the present disclosure, and are intended to be a part of the present disclosure. The exemplary embodiments of the present disclosure and the description thereof are for explaining the present disclosure and do not constitute an undue limitation of the present disclosure.

DETAILED DESCRIPTION

The technical solutions in the embodiments of the present disclosure are clearly and completely described in the following with reference to the accompanying drawings in the embodiments of the present disclosure. It is an embodiment of the disclosure, but not all of the embodiments. All other embodiments obtained by the skill in the art based on the embodiments of the present disclosure without departing from the inventive scope should fall within the scope of the present disclosure.

It should be noted that the terms "first", "second", and the like in the above-mentioned figures, specification and claims of the present disclosure are used to distinguish similar objects, and are not necessarily used to describe a particular order or sequence. It is to be understood that the data so used is interchangeable, where appropriate, so that the embodiments of the disclosure described herein can be implemented in a sequence other than those illustrated or described herein. In addition, the terms "comprises" and "includes" and any variants thereof are intended to cover non-exclusive inclusions, for example, a process, method, system, product, or device that includes a series of steps or units is not necessarily limited to those steps or units that are clearly listed, but may include those other steps or units that are not clearly listed or inherent to such processes, methods, products, or devices.

In accordance with an embodiment of the present disclosure, an embodiment of an information processing method is provided. It should be noted that the steps shown in the flowchart of the accompanying drawings may be executed in a computer system such as a set of computer executable instructions, and, although the logical order is shown in the flowchart, the steps shown or described may be performed in an order different from that herein in some cases.

Figure 1:
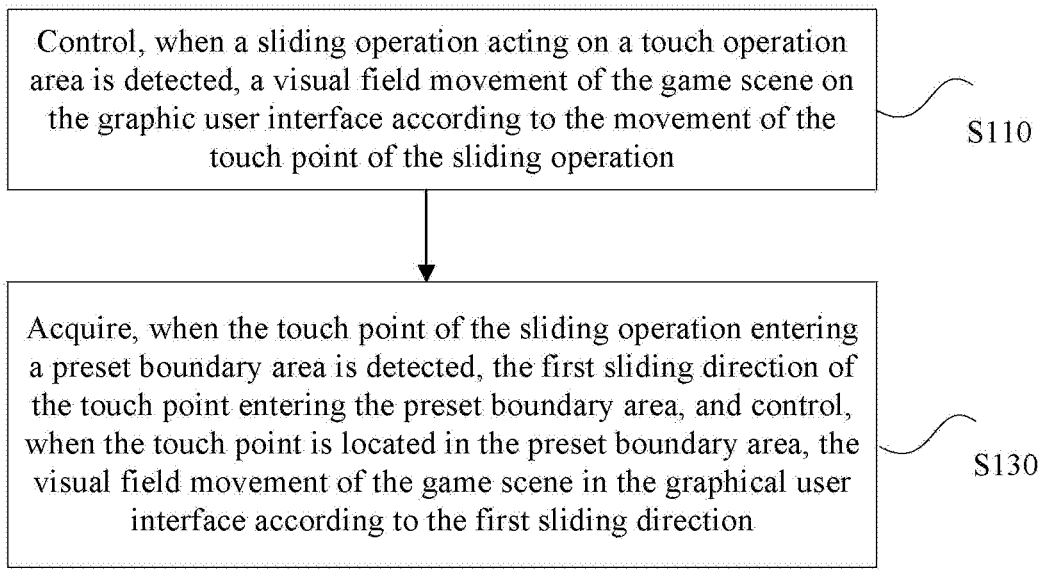
FIG. 1 schematically illustrates an information processing method according to an embodiment of the present disclosure.

FIG. 1 schematically illustrates an information processing method according to an embodiment of the present disclosure. There is provided an information processing method. A software application is executed on a processor of a mobile terminal and a graphic user interface is rendered to a touch display of the mobile terminal, and the content rendered by the graphic user interface at least partially includes a game scene. Referring to FIG. 1, the method includes step S110 and step S130.

In step S110, when a sliding operation acting on a touch operation area is detected, a visual field movement of the game scene on the graphic user interface is controlled according to the movement of the touch point of the sliding operation.

In step S130, when the touch point of the sliding operation entering a preset boundary area is detected, the first sliding direction of the touch point entering the preset boundary area is acquired, and when the touch point is located in the preset boundary area, the visual field movement of the game scene on the graphic user interface is controlled according to the first sliding direction.

Through the information processing method in the exemplary embodiment, the panoramic view of the game scene is realized. Even if the sliding operation is performed to the edge of the touch display of the mobile terminal, the visual field of the game scene can be continued to be moved, the embarrassing situation that the player can't view the target area can be avoided.

In an exemplary embodiment, the visual field movement of the game scene is controlled at different speeds according to different pressure values at the touch points of the sliding operation, which achieves to switch freely between high-precision viewing (medium speed moving) and quick viewing (fast moving) in the game scene. the technical problem of incoherence of the panoramic view of the game scene in an interactive mode of the mobile terminal is solved.

Hereinafter, each step of the information processing method in the present exemplary embodiment is further described with reference to FIG. 2 to FIG. 9.

In the present embodiment, a software application is executed on a processor of a mobile terminal 200 and a graphic user interface 210 is rendered to a touch display of the mobile terminal 200, and the content rendered by the graphic user interface 210 at least partially includes a game scene 220.

As can be appreciated, the graphic user interface 210 also includes a virtual character 211, a displacement control 212, and a skill control 213 and the like. The displacement control 212 is disposed at a lower left position of the graphic user interface 210 for controlling movement of the virtual character 211 in the game scene 220; the displacement control 212 may be an area having or not having visual indication effect in the graphic user interface 210, or may be an operation area such as a virtual joystick or a virtual button for direction control displayed in the displacement control 212, which is not limited in this exemplary embodiment. The skill control 213 is disposed at a lower right position of the graphic user interface 210 for providing a control function for casting a skill to a player; the skill indicated by the skill control 213 may be attack skills (for example, skills that reduce the blood volume of the virtual character of the enemy camp), blood-returning skills (for example, skills that can increase the blood volume of a virtual character in their own camp), and freezing skills (for example, skills that can make a virtual character of an enemy camp stand still or slow-moving); The skills may also be skills that require direction selection, or that do not require selection of a direction (click to cast immediately), and the like, and the exemplary embodiment does not limit the set number of the skill control 213, the setting mode, and the skill content indicated. Therefore, the virtual character 211 can be moved and rotated in the game scene 220 by the left-hand control, and the skill casting of the virtual character 211 can be performed by the right-hand control.

In step S110, when a sliding operation acting on a touch operation area is detected, a visual field movement of the game scene on the graphic user interface is controlled according to the movement of the touch point of the sliding operation.

In the present embodiment, when the sliding operation acting on the touch operation area 230 is detected, a visual field movement of the game scene 220 on the graphic user interface 210 is controlled according to the movement of the touch point of the sliding operation.

The touch operation area 230 may be an area having or not having visual indication effect in the graphic user interface 210, and the exemplary embodiment does not limit the shape, size and visual presentation of the touch operation area 230.

Figure 2:
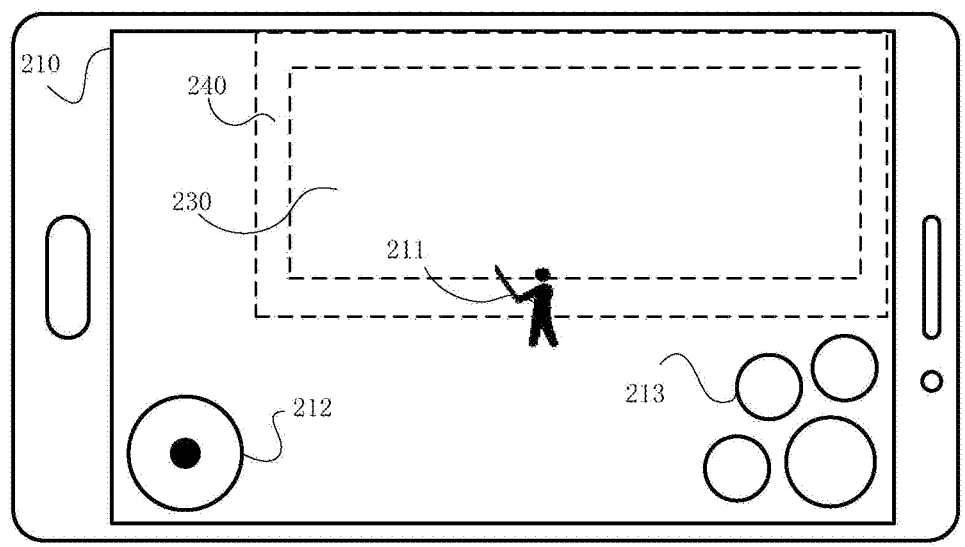
FIG. 2 schematically illustrates a first graphic user interface according to an embodiment of the present disclosure.

For example, in an exemplary embodiment of the present disclosure, referring to FIG. 2, the touch operation area 230 is a rectangle area in the upper area the graphic user interface 210 for avoiding block the game scene 220. The touch operation area 230 is an area not having visual indication effect. In other embodiments, the touch operation area 230 may also be an area of any shape and size, or a visual indication effect area having a predetermined transparency.

Figure 3:
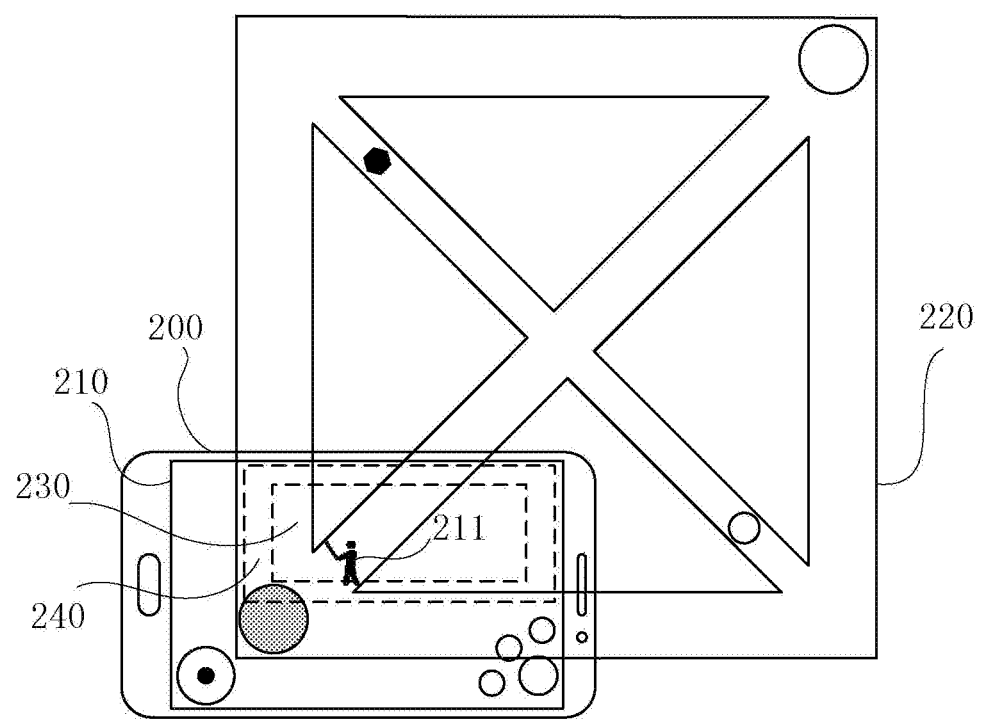
FIG. 3 schematically illustrates a first game scene according to an embodiment of the present disclosure.

In an exemplary embodiment of the present disclosure, the content rendered by the graphic user interface 210 is a part of the game scene 220. Referring to FIG. 3, since the game scene 220 is relatively large, the partial content of the game scene 220 is displayed on the graphic user interface 210 of the mobile terminal 200 during the game. When the sliding operation acting on a touch operation area 230 is detected, a visual field movement of the game scene 220 on the graphic user interface 210 is controlled according to the movement of the touch point of the sliding operation.

Figure 4:
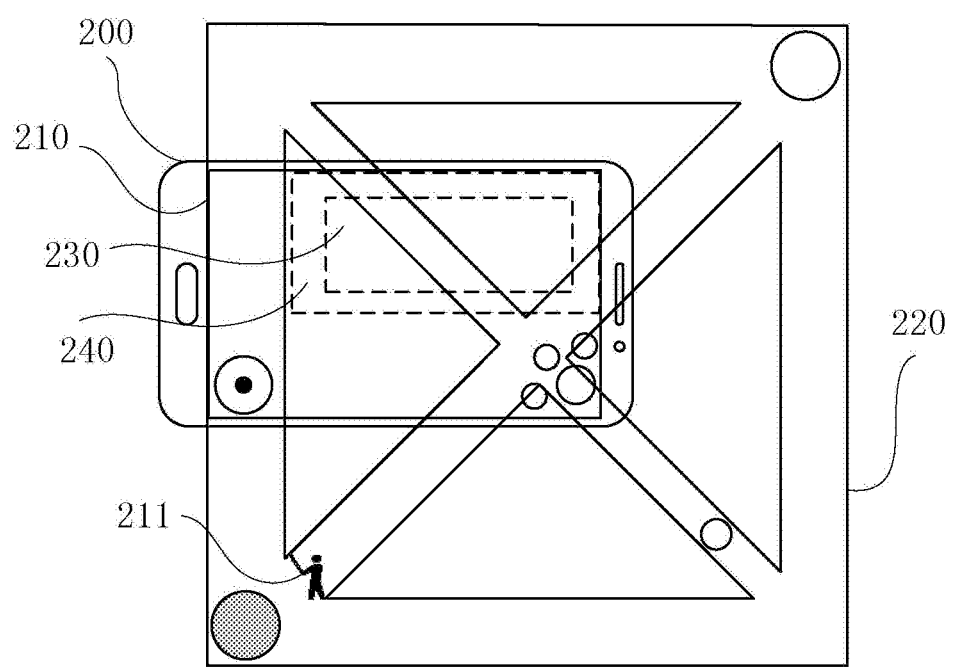
FIG. 4 schematically illustrates a second game scene according to an embodiment of the present disclosure.

For example, FIG. 3 is an initial view of the game scene 220 on the graphic user interface 210. Wherein the virtual character 211 in the game scene 220 is displayed in the middle of the graphic user interface 210, and when the sliding operation on the touch operation area 230 is detected (for example, a sliding operation acting on the touch operation area 230 in the upward direction is detected), the visual field of the game scene 220 on the graphic user interface 210 is changed according to the sliding operation. As shown in FIG. 4, the virtual character 211 in the game scene 220 is not displayed in graphic user interface 210 at this time.

In other embodiments, the content rendered in the graphic user interface 210 may also include all of the game scene 220. When a sliding operation acting on the touch operation area 230 is detected, the visual field switch of the different game scenes 220 in the graphic user interface 210 is controlled according to the movement of the touch point of the sliding operation.

The specific implementation manner of controlling the visual field movement of the game scene on the graphic user interface according to the movement of the touch point of the sliding operation may be various. For example, the moving direction and the moving distance of the visual field of the game scene can be controlled according to the moving direction and the moving distance of the touch point to, or the moving direction and the moving speed of the visual field of the game scene can be controlled according to the moving direction and the moving speed of the touch point. For another example, the moving direction of the visual field of the game scene may be controlled based on the moving direction of the touch point, while the moving speed of the visual field of the game scene may be controlled according to the preset moving speed, and the like.

As an exemplary embodiment in the present embodiment, a second adjustment coefficient is determined based on a second pressure value at the touch point of the sliding operation, and a moving distance of the visual field of the game scene on the graphic user interface is controlled according to the second adjustment coefficient; wherein the moving distance of the visual field of the game scene is derived by multiplying the moving distance of the sliding operation by the second adjustment coefficient.

Specifically, when the sliding operation acting on the touch operation area 230 is detected, the second pressure value N at the touch point of the sliding operation is detected in real time, and the second adjustment coefficient n is determined based on the second pressure value N, the moving distance S of the visual field of the game scene 220 on the graphic user interface 210 is controlled according to the second adjustment coefficient n; wherein the moving distance S of the visual field of the game scene is derived by multiplying the moving distance s of the sliding operation by the second adjustment coefficient n.

For example, the preset reference pressure value is $N_0$. When the second pressure value N at the touch point of the sliding operation is detected to be less than or equal to $N_0$, the second adjustment coefficient is determined to be $n_1$, wherein the moving distance S of the visual field of the game scene is derived by multiplying the moving distance of the sliding operation s by the second adjustment coefficient $n_1$; when the second pressure value N at the touch point of the sliding operation is detected to be greater than $N_0$, the second adjustment coefficient is determined to be $n_2$, wherein the moving distance S of the visual field of the game scene is derived by multiplying the moving distance of the sliding operation s by the second adjustment coefficient $n_2$.

As another example, the preset reference pressure value is $N_0 \sim N_1$. When the second pressure value N at the touch point of the sliding operation is detected to be less than $N_0$, the second adjustment coefficient is determined to be $n_1$, wherein the moving distance S of the visual field of the game scene is derived by multiplying the moving distance of the sliding operation s by the second adjustment coefficient $n_1$; When the second pressure value N at the touch point of the sliding operation is detected to be between $N_0$ and $N_1$ that is N is greater than or equal to $N_0$ and is less than or equal to $N_1$, the second adjustment coefficient is determined to be $n_2$, wherein the moving distance S of the visual field of the game scene is derived by multiplying the moving distance of the sliding operation s by the second adjustment coefficient $n_2$; When the second pressure value N at the touch point of the sliding operation is detected to be greater than $N_1$, the second adjustment coefficient is determined to be $n_3$, wherein the moving distance S of the visual field of the game scene is derived by multiplying the moving distance of the sliding operation s by the second adjustment coefficient $n_3$.

By setting different pressure gradients, when a sliding operation acting on the touch operation area is detected, different adjustment coefficients are determined based on the pressure gradient range of the pressure value at the touch point of the sliding operation, and the moving distance of the visual field of the game scene is controlled in a different multiple relationship with the moving distance of the sliding operation, i.e., the visual field movement of the game scene is controlled at different speeds, which achieves to switch freely between high-precision viewing (medium speed moving) and quick viewing (fast moving) in the game scene to satisfy different needs of players in different situations thereby. Even if the sliding operation is performed to the edge of the touch display of the mobile terminal, the visual field can continue to be moved to avoid the embarrassing situation that players can't view the target area.

In the present exemplary embodiment, the movement of the visual field of the game scene on the graphic user interface is controlled according to the touch point movement of the sliding operation, which includes that a moving track for the visual field of the game scene on the graphic user interface is controlled according to a moving track of the touch point of the sliding operation.

Specifically, when the sliding operation acting on the touch operation area is detected, the moving track of the touch point of the sliding operation is detected in real time, the visual field of the game scene 220 on the graphic user interface 210 is controlled to move in the consistent manner to the sliding track of the touch point, i.e., the moving track of the virtual camera is consistent with the sliding track of the touch point of the sliding operation.

Figure 5:
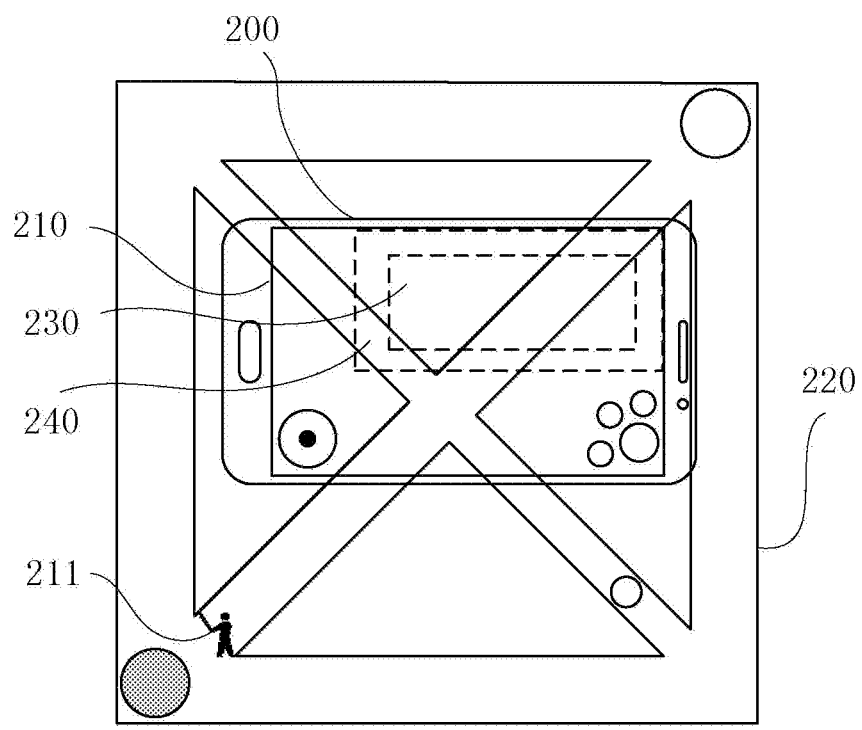
FIG. 5 schematically illustrates a third game scene according to an embodiment of the present disclosure.

For example, FIG. 3 is an initial visual field of the game scene 220 on the graphic user interface 210, wherein the virtual character 211 in the game scene 220 is displayed in the middle of the graphic user interface 210, and when the sliding operation on the touch operation area 230 is detected, for example, the sliding operation is to first slide up some distance and then slide to the right for some distance. The visual field of the game scene 220 on the graphic user interface 210 is controlled to move in the consistent manner to the sliding track of the touch point, i.e., the visual field of the game scene 220 is controlled to first move up for some distance as shown in FIG. 4, and then move to the right for some distance as shown in FIG. 5.

In other embodiments, when the sliding operation acting on the touch operation area 230 is detected, the visual field of the game scene 220 on the graphic user interface 210 can also be controlled to move in the opposite direction to the sliding track of the touch point, i.e., the game scene 220 is dragged directly.

For example, FIG. 3 is an initial visual field of the game scene 220 on the graphic user interface 210, wherein the virtual character 211 in the game scene 220 is displayed in the middle of the graphic user interface 210, and when the sliding operation on the touch operation area 230 is detected, for example, the sliding operation is to first slide down for some distance and then slide to the left for some distance. The visual field of the game scene 220 on the graphic user interface 210 is controlled to move in the opposite direction to the sliding track of the touch point, i.e., the visual field of the game scene 220 is controlled to first move up some distance as shown in FIG. 4, and then move to the right for some distance as shown in FIG. 5.

In the present exemplary embodiment, when a sliding operation acting on the touch operation area 230 is detected, a joystick for visual field moving is generated at the touch point position of the sliding operation. The joystick for visual field moving moves following the movement of the touch point of the sliding operation, which may or may not have a visual indication effect.

In step S130, when the touch point of the sliding operation entering a preset boundary area is detected, the first sliding direction of the touch point entering the preset boundary area is acquired, and when the touch point is located in the preset boundary area, the visual field movement of the game scene on the graphic user interface is controlled according to the first sliding direction.

The visual field movement of the game scene on the graphic user interface is controlled according to the first sliding direction refers that the first sliding direction is used as a control variable for moving the visual field of the game scene, which may also be the only control variable for moving the visual field of the game scene, for example: a sliding direction and a fixed moving speed are used to control the movement of the visual field; it may also be one of a plurality of control variables for moving the visual field of the game scene, for example, in an exemplary embodiment, the visual field movement of the game scene on the graphic user interface is controlled according to the first sliding direction and the first pressure value at the touch point, or in other embodiments, the visual field movement of the game scene on the graphic user interface is controlled based on the superposition of the first sliding direction and the second sliding direction. Hereinafter, the present disclosure will be mainly described with reference to the exemplary embodiments.

In the present exemplary embodiment, when the touch point of the sliding operation entering a preset boundary area 240 is detected, the first sliding direction of the touch point is acquired at the moment (that is, when the touch point enters the preset boundary area), and when the touch point is located in the preset boundary area 240, the visual field movement of the game scene 220 on the graphic user interface 210 is controlled according to the first sliding direction.

In the present exemplary embodiment, the preset boundary area 240 is disposed outside the touch operation area, and the preset boundary area 240 may be a closed annular area, as shown in FIG. 2, or may be one or more independent areas, for example, when the touch operation area 230 used for controlling the movement of the scene is located on the right side of the screen, according to the requirements of different games, the boundary area may be set only on the right side of the touch operation area 230, or may be simultaneously set on the top, the bottom, and the right side of the touch operation area 230, and the left side thereof rarely touched by players can be unset.

As an exemplary embodiment, the preset boundary area 240 is a frame area having a preset width and disposed around the touch operation area 230.

The preset boundary area 240 may be an area having or not having visual indication effect in the graphic user interface 210. The exemplary embodiment does not limit the shape, size and visual presentation of the preset boundary area 240.

For example, in a specific embodiment of the present disclosure, as shown in FIG. 2, the preset boundary area 240 is a rectangular frame area having a preset width and disposed around the touch operation area 230. The outer outline of the rectangular frame is similar to the outline of the touch operation area 230, and larger than the touch operation area 230. The inner contour thereof coincides with the edge of the touch operation area 230. To avoid blocking the game scene 220, the preset boundary area 240 is an area that does not have a visual indication effect. In other embodiments, the preset boundary area 240 may also be an area of any shape and size disposed around the touch operation area 230, and may be similar or dissimilar to the outline of the touch operation area 230, or have a visual indication effect area having a predetermined transparency.

As described above, in other embodiments, the preset boundary area 240 may not be disposed around the touch operation area 230. For example, the touch operation area 230 is a rectangular area having a length and a width, and the preset boundary area 240 may be a strip area having a preset width and disposed adjacent to the edge of the touch operation area 230 in the length direction; or A "¬" shaped area having a preset width and disposed adjacent to the two edges of the touch operation area 230 in the length and width direction.

In the present exemplary embodiment, at least two outer edges of the preset boundary area 240 coincide with the graphic user interface 210. As shown in FIG. 2, the preset boundary area 240 is disposed in the upper right corner of the graphic user interface 210, and its upper and right edges coincide with the upper and right edges of the graphic user interface 210 respectively. In general, in order to avoid blocking the game scene 220, the preset boundary area 240 is set as an area without visual indication effect, and at least two outer edges of the preset boundary area 240 are set to coincide with the graphic user interface 210, so that the player can quickly identify the approximate location of the preset boundary area 240. For example, when the touch point of the sliding operation entering the right side of the preset boundary area 240 is detected, the visual field movement of the game scene 220 on the graphic user interface 210 is controlled according to the first sliding direction of the touch point at this time, i.e., when the player's finger slides near the right edge of the graphic user interface 210, the visual field movement of the game scene 220 is controlled in accordance with the first sliding direction. The embarrassing situation, that the visual field cannot continue to be moved once the sliding operation is performed to the edge of the touch display of the mobile terminal, can be avoided.

Figure 6:
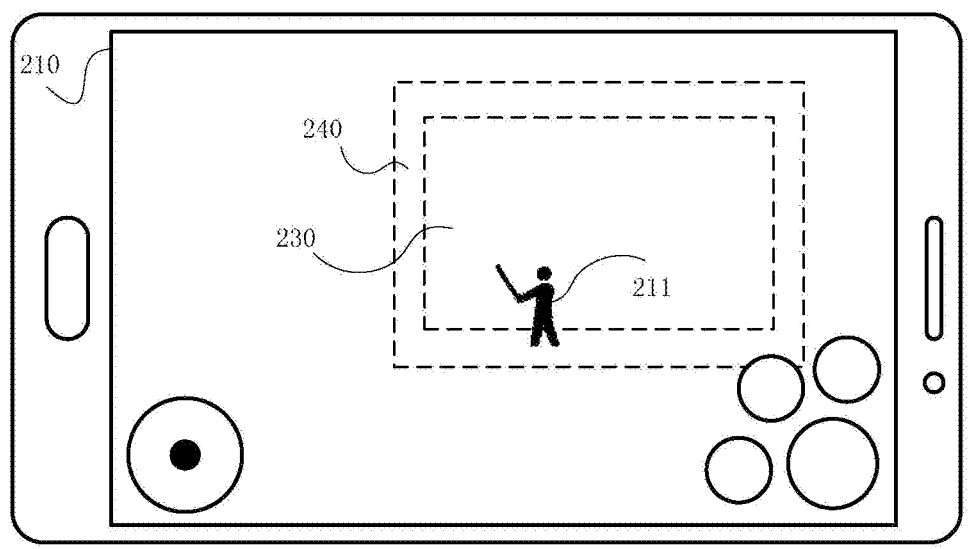
FIG. 6 schematically illustrates a second graphic user interface according to an embodiment of the present disclosure.

In other embodiments, the outer edge of the preset boundary area 240 may also not coincide with the graphic user interface 210. As shown in FIG. 6, the preset boundary area 240 is disposed in a central area of the graphic user interface 210, and the outer contour of the preset boundary area 240 has a certain distance from the edge of the graphic user interface 210. When the touch point of the sliding operation entering the preset boundary area 240 is detected, the visual field movement of the game scene 220 on the graphic user interface 210 is controlled according to the first sliding direction of the touch point at this time. It is convenient for the player to achieve a panoramic view of the game scene in a small control area without sliding the finger to the edge of the graphic user interface.

As described above, the visual field movement of the game scene on the graphic user interface is controlled according to the first sliding direction refers that the first sliding direction is used as a control variable for moving the visual field of the game scene, which may also be the only control variable for moving the visual field of the game scene, or which may also be one of a plurality of control variables for moving the visual field of the game scene.

In the present exemplary embodiment, the visual field movement of the game scene on the graphic user interface is controlled according to the first sliding direction, which includes that the visual field movement of the game scene on the graphic user interface is controlled according to the first sliding direction and the first pressure value at the touch point.

As an exemplary embodiment, the visual field movement of the game scene on the graphic user interface is controlled according to the first sliding direction and the first pressure value of the touch point, which includes a first adjustment coefficient based on the first pressure value as detected, and that a moving distance of the visual field of the game scene on the graphic user interface is controlled according to the first adjustment coefficient; wherein the moving distance of the visual field of the game scene is derived by multiplying a dwell time of the touch point in the preset boundary area by the first adjustment coefficient.

Specifically, when the touch point of the sliding operation entering the preset boundary area 240 is detected, the first pressure value M at the touch point of the preset boundary area 240 is detected at the moment, and the first adjustment coefficient v is determined based on the first pressure value M, the visual field moving distance S of the game scene 220 on the graphic user interface 210 is controlled according to the first adjustment coefficient v; wherein the moving distance of the visual field S of the game scene is derived by multiplying a dwell time of the touch point t in the preset boundary area by the first adjustment coefficient v. In other words, when the player's finger performs a sliding operation in the touch operation area 230, the visual field movement of the game scene 220 is controlled according to the movement of the sliding operation; when the sliding operation enters the preset boundary area 240, the finger is kept stay at the preset boundary area 240 (the sliding operation is not required at this time), the visual field movement of the game scene 220 can be continuously controlled.

For example, the preset reference pressure value is $M_0$. When the touch point of the sliding operation entering the preset boundary area 240 is detected, the first pressure value M at the touch point entering the preset boundary area 240 is less than or equal to $M_0$, the first adjustment coefficient is determined to be $v_1$; wherein the moving distance of the visual field S of the game scene is derived by multiplying a dwell time t of the touch point t in the preset boundary area by the first adjustment coefficient $v_1$. When the first pressure value M at the touch point entering the preset boundary area 240 is detected to be greater than $M_0$, the first adjustment coefficient is determined to be $v_2$; wherein the moving distance of the visual field S of the game scene is derived by multiplying a dwell time t of the touch point tin the preset boundary area by the first adjustment coefficient $v_2$.

As another example, the preset reference pressure value is $M_0 \sim M_1$. When the first pressure value M at the touch point entering the preset boundary area 240 is detected to be less than $M_0$, the first adjustment coefficient is determined to be $v_1$, wherein the moving distance of the visual field S of the game scene is derived by multiplying a dwell time t of the touch point tin the preset boundary area by the first adjustment coefficient $v_1$; When the first pressure value M at the touch point entering the preset boundary area 240 is detected to be between $M_0$ and $M_1$, that M is greater than or equal to $M_0$ and is less than or equal to $M_1$, the first adjustment coefficient is determined to be $v_2$, wherein the moving distance of the visual field S of the game scene is derived by multiplying a dwell time t of the touch point in the preset boundary area by the first adjustment coefficient $v_2$; When the first pressure value M at the touch point entering the preset boundary area 240 is detected to be greater than $M_1$, the first adjustment coefficient is determined to be $v_3$, wherein the moving distance of the visual field S of the game scene is derived by multiplying a dwell time t of the touch point tin the preset boundary area by the first adjustment coefficient $v_3$.

By setting different pressure gradients, when the pressure value at the touch point in the preset boundary area is detected, the visual field movement of the game scene can be controlled at different speeds according to different pressure values of the touch points, which achieves to switch freely between high-precision viewing (medium speed moving) and quick viewing (fast moving) in the game scene to server different needs of players in different situations thereby.

In the present exemplary embodiment, the visual field movement of the game scene on the graphic user interface is controlled according to the first sliding direction and the first pressure value of the touch point, which includes that the direction of movement of the game scene is determined according to the first sliding direction of the touch point entering the preset boundary area.

In the present exemplary embodiment, the visual field movement of the game scene on the graphic user interface is controlled according to the first sliding direction, which includes that the game scene on the graphic user interface is controlled to continue moving in the same direction as the first sliding direction, or the game scene on the graphic user interface is controlled to continue moving in the opposite direction of the first sliding direction.

Specifically, when the touch point of the sliding operation entering the preset boundary area 240 is detected, the first sliding direction of the touch point entering the preset boundary area 240 is acquired, and the moving direction of the visual field of the game scene 220 is determined according to the first sliding direction. The game scene 220 on the graphic user interface 210 is controlled to move in the consistent manner to the moving direction of the visual field, i.e., the moving direction of the virtual camera is consistent with the sliding direction of the touch point entering the preset boundary area 240.

Figure 7:
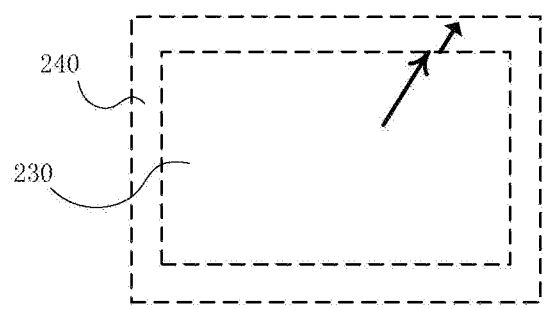
FIG. 7 schematically illustrates a first sliding direction according to a touch point of a sliding operation entering a preset boundary area in an embodiment of the present disclosure.
Figure 8:
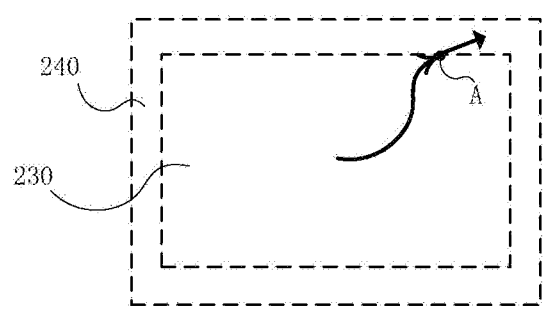
FIG. 8 schematically illustrates a first sliding direction according to a touch point of a sliding operation entering a preset boundary area in an embodiment of the present disclosure.

When the touch point of the sliding operation enters the preset boundary area 240, the first sliding direction of the touch point may be the moving direction of the sliding operation, or may be the tangential direction of the touch point of the sliding operation. For example, when the moving track of the sliding operation acting on the touch operation area 230 is a straight line, as shown in FIG. 7, wherein the first sliding direction of the touch point entering the preset boundary area is consistent with the moving direction of the sliding operation. When the moving track of the sliding operation acting on the touch operation area 230 is a curve, as shown in FIG. 8, wherein the first sliding direction of the touch point entering the preset boundary area is the tangential direction of the touch point A where the track of the sliding operation intersects the boundary of the touch operation area 230.

In other embodiments, the visual field movements of the game scene on the graphic user interface is controlled according to the first sliding direction, which includes that a second sliding direction of a touch point within the preset boundary area in a preset direction is detected; and the visual field movement of the game scene on the graphic user interface is controlled according to the superposition of the first sliding direction and the second sliding direction.

Figure 9:
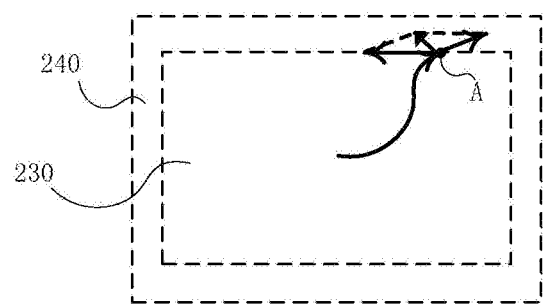
FIG. 9 schematically illustrates a first sliding direction and a second sliding direction according to a touch point of a sliding operation entering a preset boundary area in an embodiment of the present disclosure.

For example, as shown in FIG. 9, a first sliding direction is determined when the touch point of the sliding operation enters the preset boundary area 240, that refers to the direction pointing to the right front in the figure; when a second sliding direction of a touch point within the preset boundary area in a preset direction is detected as shown in FIG. 9, when a horizontally-left sliding operation (the second sliding direction) acting on the preset boundary region 240 is detected, according to the first sliding direction and the second sliding direction (i.e., the horizontally-left sliding operation direction) performs vector sum to determine the moving direction of the visual field of the game scene 220, that refers to the direction pointing to the left front in the figure.

In the present exemplary embodiment, when it is detected that the touch point is away from the touch operation area and the preset boundary area, the visual field of the game scene on the graphic user interface is reset.

There are various ways to reset the visual field of the game scene on the graphic user interface, which may be reset to recalculate the visual field according to the logic of calculating the visual field of the game before the sliding operation, or may be reset to a specific visual field.

As an exemplary embodiment, the visual field of the game scene 220 on the graphic user interface 210 is reset, which includes that the visual field of the game scene on the graphic user interface is reset with a virtual character as a center of the visual field. For example, after being controlled according to the sliding operation, FIG. 4 or FIG. 5 is a visual field of the game scene 220 on the graphic user interface 210, wherein the virtual character 211 in the game scene 220 is not displayed in the graphic user interface 210; When it is detected that the pressure value in the touch operation area 230 or the preset boundary area 240 is zero, the visual field of the game scene on the graphic user interface is reset with a virtual character as a center of the visual field. As shown in FIG. 3, wherein the virtual character 211 in the game scene 220 is displayed at an intermediate position of the graphic user interface 210. It is convenient for the player to quickly restore the game view of the virtual character when the player stops viewing the game scene. The exemplary embodiment may be preferably applied to a game of a third person perspective. In the game of the first person perspective, the default view is constructed with a virtual character's crosshair as a center of the visual field. In this case, it is preferably reset with a virtual character's crosshair as a center of the visual field.

It can be understood that, in the present exemplary embodiment, in order to save the screen space and reduce the block of the game scene 220, when the touch point is detected to leave the touch operation area 230 and the preset boundary area 240, the joystick for moving visual field is deleted.

Through the information processing method in the exemplary embodiment, on the one hand, a panoramic view of the game scene is realized, wherein when the player performs a sliding operation in the touch operation area, the visual field movement of the game scene is controlled according to the movement track of the sliding operation; When the touch point of the sliding operation enters the preset boundary area, even if the sliding operation is performed to the edge of the touch display of the mobile terminal, as long as the finger is kept to stay in the preset boundary area, the visual field of the game scene can be continued to be moved to avoid the embarrassing situation that players can't view the target area; on the other hand, according to the different pressure values of the sliding points of the sliding operation, the visual field movement of the game scene is controlled at different speeds, which achieves to switch freely between high-precision viewing (medium speed moving) and quick viewing (fast moving) in the game scene. The technical problem of incoherent view of the panoramic visual field of the game scene in an interactive mode of the mobile terminal is solved.

Figure 10:
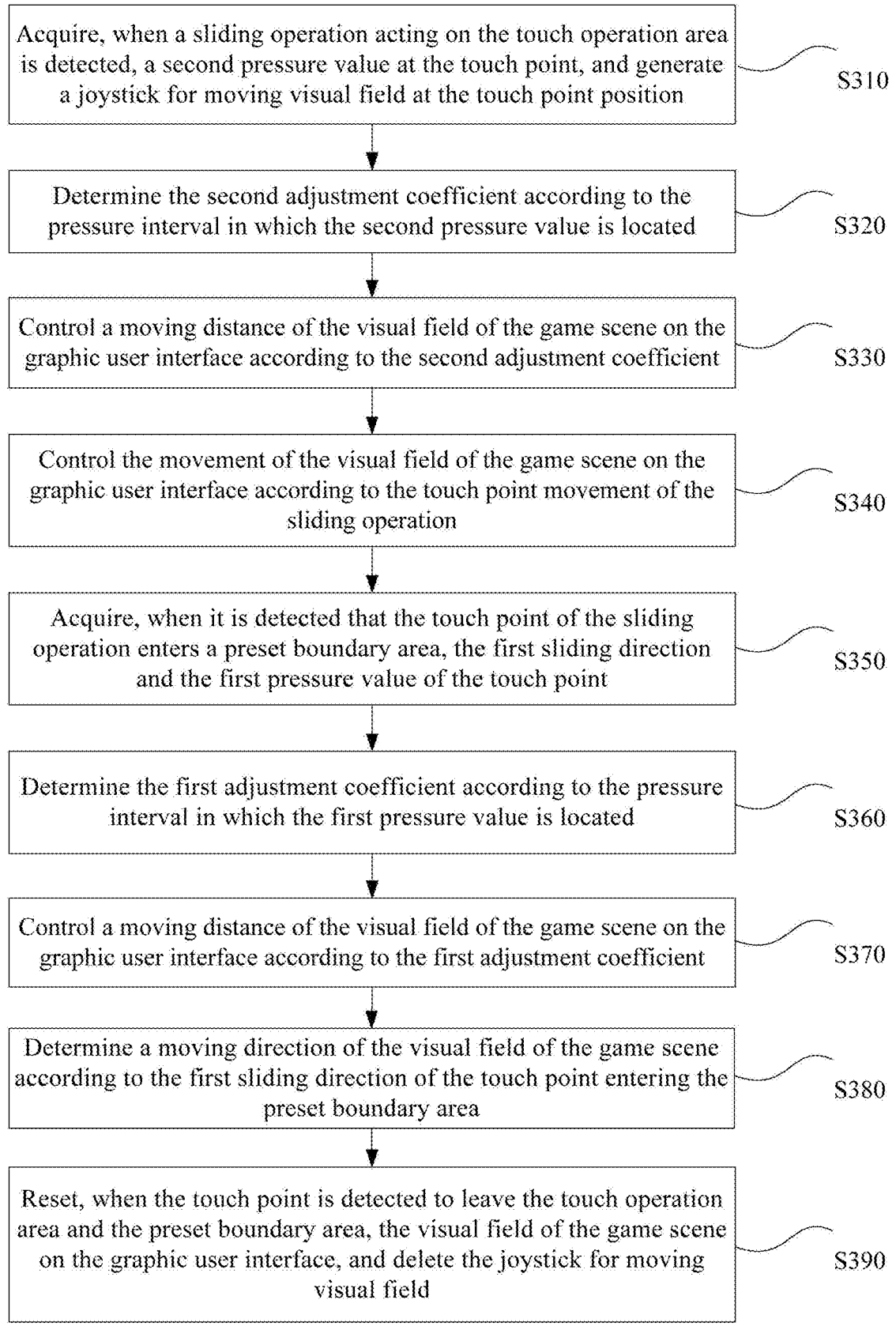
FIG. 10 schematically illustrates an information processing method according to an embodiment of the present disclosure.

The operation of the player's game scene panoramic view and the corresponding response during the execution of the method of an alternative embodiment of the present disclosure are illustrated below with reference to FIG. 2 and FIG. 10. A software application is executed on a processor of a mobile terminal 200 and a graphic user interface 210 is rendered to a touch display of the mobile terminal 200, and the content rendered by the graphic user interface 210 at least partially includes a game scene 220.

The graphic user interface 210 further includes a touch operation area 230 and a preset boundary area 240. Wherein the touch operation area 230 and the preset boundary area 240 are touch areas that do not have a visual indication effect, and are located on the upper right side of the user graphic interface 210. The two outer edges of the preset boundary area 240 coincide with the graphic user interface 210. Specifically, the touch operation area 230 is a rectangular area, and the preset boundary area 240 is a preset width border area set around the touch operation area 230.

In step S310, when a sliding operation acting on the touch operation area is detected, a second pressure value at the touch point is acquired. A joystick for moving visual field is generated at the touch point position of the sliding operation.

Wherein, when the player touches and performs a sliding operation within the touch operation area 230 of the touch display of the mobile terminal 200, the second pressure value N of the touch point of the touch display touched by the finger is acquired. The joystick for moving visual field is generated. The joystick for moving visual field is an invisible control that moves following the movement of the touch point of the sliding operation.

In step S320, the second adjustment coefficient is determined according to the pressure interval in which the second pressure value is located.

Specifically, the preset reference pressure value is $N_0$. When the second pressure value N at the touch point of the sliding operation is detected to be less than or equal to $N_0$, the second adjustment coefficient is determined to be $n_1$; when the second pressure value N at the touch point of the sliding operation is detected to be greater than $N_0$, the second adjustment coefficient is determined to be $n_2$.

In step S330, a moving distance of the visual field of the game scene is controlled on the graphic user interface according to the second adjustment coefficient.

Specifically, according to the second adjustment coefficient n determined in step 320, the moving distance of the visual field of the game scene 220 on the graphic user interface 210 is controlled according to the following formula.

Wherein the moving distance of the visual field of the game scene S is derived by multiplying the moving distance of the sliding operation s by the second adjustment coefficient n.

The visual field movement track of the game scene 220 on the graphic user interface 210 is controlled according to the movement track of the touch point of the sliding operation.

In step S340, the movement of the visual field of the game scene on the graphic user interface is controlled according to the touch point movement of the sliding operation.

Specifically, when the sliding operation of the touch operation area 230 is detected, the sliding track of the touch point of the sliding operation is detected in real time, and the visual field of the game scene 220 on the graphic user interface 210 is controlled to move in the consistent manner to the sliding track of the touch point.

In step S350, when it is detected that the touch point of the sliding operation enters a preset boundary area, the first sliding direction and the first pressure value of the touch point are acquired.

Wherein, the player touches by a finger and operates by sliding on the touch operation area 230 on the touch display of the mobile terminal 200. When the touch point of the slide operation enters the preset boundary area 240, the first sliding direction and the first pressure value of the touch point are acquired. i.e., the touch point, are located within the preset boundary area 240.

In step S360, the first adjustment coefficient is determined according to the pressure interval in which the first pressure value is located.

Specifically, the preset reference pressure value is $M_0$. When the touch point of the sliding operation entering the preset boundary area 240 is detected, the first pressure value M at the touch point of the sliding operation is detected to be less than or equal to $M_0$, the first adjustment coefficient is determined to be $v_1$; when the first pressure value M at the touch point of the sliding operation is detected to be greater than $M_0$, the first adjustment coefficient is determined to be $v_2$.

In step S370, a moving distance of the visual field of the game scene is controlled on the graphic user interface according to the first adjustment coefficient.

Specifically, according to the second adjustment coefficient v determined in step 360, the moving distance of the visual field of the game scene 220 on the graphic user interface 210 is controlled according to the following formula.

Wherein the moving distance of the visual field of the game scene S is derived by multiplying a dwell time of the touch point t in the preset boundary area by the first adjustment coefficient v.

In step S380, a moving direction of the visual field of the game scene is determined according to the first sliding direction of the touch point entering the preset boundary area.

Specifically, in step 350, when the touch point of the sliding operation entering the preset boundary area 240 is detected, the first sliding direction of the touch point is acquired, and the moving direction of the visual field of the game scene 220 is determined according to the first sliding direction. The game scene 220 on the graphic user interface 210 is controlled to move in the consistent manner to the moving direction of the visual field.

In step S390, when the touch point is detected to leave the touch operation area and the preset boundary area, the visual field of the game scene on the graphic user interface is reset and the joystick for moving visual field is deleted.

Specifically, the visual field of the game scene 220 on the graphic user interface 210 is reset, which includes that the visual field of the game scene on the graphic user interface is reset with a virtual character as a center of the rendering view.

According to the method provided by the present disclosure, the space for the player to operate is added, and the switch freely between the high-precision viewing and the quick viewing is easily realized, and the different requirements of the player in different situations are satisfied. The embarrassing situation, that the visual field cannot continue to be moved once the sliding operation is performed to the edge of the touch display of the mobile terminal, can be avoided. Furthermore, the technical problem of incoherent view of the panoramic visual field of the game scene in an interactive mode of the mobile terminal is solved.

In an embodiment of the present disclosure, there is provided an information processing apparatus, wherein a software application is executed on a processor of a mobile terminal and a graphic user interface is rendered to a touch display of the mobile terminal, and the content rendered by the graphic user interface at least partially includes a game scene, which includes:

a first interactive unit, configured to control a visual field movement of the game scene on the graphic user interface according to the movement of the touch point of the sliding operation upon detecting a sliding operation acting on a touch operation area; and a second interactive unit, configured to acquire the first sliding direction of the touch point entering the preset boundary area upon detecting that the touch point of the sliding operation enters a preset boundary area, and control, when the touch point is located in the preset boundary area, the visual field movement of the game scene on the graphic user interface according to the first sliding direction.

The specific details of each of the above information processing device units have been described in detail in the corresponding information processing method, and thus will not be described herein.

It should be noted that although several modules or units of equipment for action execution are mentioned in the detailed description above, such division is not mandatory. In fact, features and functions of two or more of the modules or units described above may be embodied in one module or unit in accordance with the embodiments of the present disclosure. Conversely, the features and functions of one module or unit described above may be further divided into multiple modules or units.

According to one embodiment of the present disclosure, there is provided a computer readable storage medium having stored thereon a program product capable of implementing the above method of the present specification. In some possible implementations, aspects of the present disclosure may also be embodied in the form of a program product including program code for causing a terminal device to perform the above description, when the program product is run on a terminal device, the steps in accordance with various exemplary embodiments of the disclosure are described in the "Exemplary Methods" section. It can be a portable compact disk read only memory (CD-ROM) and includes program code and can be run on a terminal device such as a personal computer. However, the program product of the present disclosure is not limited thereto, and in the present document, the readable storage medium may be any tangible medium containing or storing a program that can be used by or in connection with an instruction execution system, apparatus or device.

The program product can take any combination of one or more readable media. The readable medium can be a readable signal medium or a readable storage medium. The readable storage medium can be, for example, but not limited to, an electronic, magnetic, optical, electromagnetic, infrared, or semiconductor system, apparatus, or device, or any combination of the above. More specific examples (non-exhaustive lists) of readable storage media include: electrical connections with one or more wires, portable disks, hard disks, random access memory (RAM), read only memory (ROM), erasable Programmable read-only memory (EPROM or flash memory), optical fiber, portable compact disk read only memory (CD-ROM), optical storage device, magnetic storage device, or any suitable combination of the foregoing.

According to an embodiment of the present disclosure, there is also provided an electronic device, including: a processing component, which may further include one or more processors, and memory resources represented by the memory for storing the processable components executed instructions, such as applications. An application stored in the memory may include one or more modules each corresponding to a set of instructions. Further, the processing component is configured to execute instructions to perform the information processing method described above.

The electronic device can also include: a power component configured to perform power management of the executing electronic device; a wired or wireless network interface configured to connect the electronic device to the network; and an input/output (I/O) interface. The electronic device can operate based on an operating system stored in the memory, such as Android, iOS, Windows, Mac OS X, Unix, Linux, FreeBSD or the like.

The serial numbers of the embodiments of the present disclosure are merely for the description, and do not represent the advantages and disadvantages of the embodiments.

In the above-mentioned embodiments of the present disclosure, the descriptions of the various embodiments are different, and the parts that are not detailed in a certain embodiment can be referred to the related descriptions of other embodiments.

In the several embodiments provided by the present disclosure, it should be understood that the disclosed technical contents may be implemented in other manners. The device embodiments described above are merely schematic. For example, the division of a unit may be a logical function division. In actual implementation, there may be another division manner. For example, multiple units or components may be combined or may be integrated into another system, or some features can be ignored or not executed. In addition, the mutual coupling or direct coupling or communication connection shown or discussed may be an indirect coupling or communication connection through some interface, unit or module, and may be electrical or otherwise.

The units described as separate components may or may not be physically separate, and the components displayed as units may or may not be physical units, that is, may be located in one place, or may be distributed to multiple units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit. The above integrated unit can be implemented in the form of hardware or in the form of a software functional unit.

An integrated unit, if implemented in the form of a software functional unit and sold or used as a stand-alone product, can be stored in a computer readable storage medium. Based on such understanding, the technical solution of the present invention, in essence or in part, or all or part of the technical solution may be embodied in the form of a software product stored in a storage medium. A number of instructions are included to cause a computer device (which may be a personal computer, server or network device, etc.) to perform all or part of the steps of the various embodiments of the present disclosure.

The above is only an exemplary embodiment of the present disclosure, and it should be noted that those skilled in the art can also make several improvements and modifications without departing from the principles of the present disclosure. These improvements and modifications should also be considered for the protection scope of the present disclosure.

What is claimed is:

1. An information processing method, implemented by a mobile terminal comprising a touch display and rendering a graphic user interface on the touch display, content presented on the graphic user interface at least comprising a game scene, wherein the method comprises:

when a sliding operation acting on a touch operation area is detected, controlling a visual field movement of the game scene on the graphic user interface according to the movement of the touch point of the sliding operation; and when it is detected that the touch point of the sliding operation enters a preset boundary area, acquiring the first sliding direction of the touch point entering the preset boundary area, and controlling, when the touch point is located in the preset boundary area, the visual field movement of the game scene on the graphic user interface according to the first sliding direction, wherein the preset boundary area is located outside the touch operation area.

2. The method according to claim 1, wherein the controlling the visual field movement of the game scene on the graphic user interface according to the first sliding direction comprises:

controlling the visual field movement of the game scene on the graphic user interface according to the first sliding direction and a first pressure value at the touch point.

3. The method according to claim 2, wherein the controlling the visual field movement of the game scene on the graphic user interface according to the first sliding direction and the first pressure value at the touch point comprises:

determining a first adjustment coefficient based on the first pressure value as detected, and controlling a moving distance of the visual field of the game scene on the graphic user interface according to the first adjustment coefficient;

wherein the moving distance of the visual field of the game scene is derived by multiplying a dwell time of the touch point in the preset boundary area by the first adjustment coefficient.

4. The method according to claim 2, wherein the controlling the visual field movement of the game scene on the graphic user interface according to the first sliding direction and the first pressure value at the touch point comprises:

determining a moving direction of the visual field of the game scene according to the first sliding direction of the touch point entering the preset boundary area.

5. The method according to claim 1, wherein the controlling the visual field movement of the game scene on the graphic user interface according to the touch point movement of the sliding operation comprises:

determining a second adjustment coefficient based on a second pressure value at the touch point of the sliding operation; and controlling a moving distance of the visual field of the game scene on the graphic user interface according to the second adjustment coefficient, wherein the moving distance of the visual field of the game scene is derived by multiplying the moving distance of the sliding operation by the second adjustment coefficient.

6. The method according to claim 1, wherein the controlling the movement of the visual field of the game scene on the graphic user interface according to the touch point movement of the sliding operation comprises:

controlling a moving track for the visual field of the game scene on the graphic user interface according to a moving track of the touch point of the sliding operation.

7. The method according to claim 1, further comprising:

when it is detected that the touch point leaves the touch operation area and the preset boundary area, resetting the visual field of the game scene on the graphic user interface.

8. The method according to claim 7, wherein the resetting the visual field of the game scene on the graphic user interface comprises:

resetting the visual field of the game scene on the graphic user interface with a virtual character as a center of the visual field.

9. The method according to claim 1, further comprising:

when a sliding operation acting on the touch operation area is detected, generating a joystick for moving visual field at the touch point position of the sliding operation.

10. The method according to claim 1, wherein the controlling the visual field movement of the game scene on the graphic user interface according to the first sliding direction comprises:

controlling the visual field of the game scene on the graphic user interface to continuously move in a same direction as the first sliding direction, or controlling the visual field of the game scene on the graphic user interface to continuously move in a opposite direction of the first sliding direction.

11. The method according to claim 1, wherein the controlling the visual field movements of the game scene on the graphic user interface according to the first sliding direction comprises:

detecting a second sliding direction of a touch point within the preset boundary area in a preset direction; and controlling the visual field movement of the game scene on the graphic user interface according to superposition of the first sliding direction and the second sliding direction.

12. A non-transitory computer readable storage medium storing a computer program, applied to a mobile terminal comprising a touch display and rendering a graphic user interface on the touch display, content presented on the graphic user interface at least comprising a game scene, wherein the computer program is executed by a processor to implement:

when a sliding operation acting on a touch operation area is detected, controlling a visual field movement of the game scene on the graphic user interface according to the movement of the touch point of the sliding operation; and when it is detected that the touch point of the sliding operation enters a preset boundary area, acquiring the first sliding direction of the touch point entering the preset boundary area, and controlling, when the touch point is located in the preset boundary area, the visual field movement of the game scene on the graphic user interface according to the first sliding direction, wherein the preset boundary area is located outside the touch operation area.

13. An electronic device, applied to a mobile terminal comprising a touch display and rendering a graphic user interface on the touch display, content presented on the graphic user interface at least comprising a game scene, wherein the electronic device comprises:

a processor; and a memory for storing executable instructions of the processor;

wherein the processor is configured to implement following steps by executing the executable instruction:

when a sliding operation acting on a touch operation area is detected, controlling a visual field movement of the game scene on the graphic user interface according to the movement of the touch point of the sliding operation; and when it is detected that the touch point of the sliding operation enters a preset boundary area, acquiring the first sliding direction of the touch point entering the preset boundary area, and controlling, when the touch point is located in the preset boundary area, the visual field movement of the game scene on the graphic user interface according to the first sliding direction,
wherein the preset boundary area is located outside the touch operation area.

14. The device according to claim 13, wherein the processor configured to implement controlling the visual field movement of the game scene on the graphic user interface according to the first sliding direction is further configured to implement:
controlling the visual field movement of the game scene on the graphic user interface according to the first sliding direction and the first pressure value at the touch point.

15. The device according to claim 14, wherein the processor configured to implement controlling the visual field movement of the game scene on the graphic user interface according to the first sliding direction and the first pressure value at the touch point is further configured to implement:
determining a first adjustment coefficient based on the first pressure value as detected, and
controlling a moving distance of the visual field of the game scene on the graphic user interface according to the first adjustment coefficient;
wherein the moving distance of the visual field of the game scene is derived by multiplying a dwell time of the touch point in the preset boundary area by the first adjustment coefficient.

16. The device according to claim 13, wherein the processor configured to implement controlling the visual field movement of the game scene on the graphic user interface according to the touch point movement of the sliding operation is further configured to implement:
determining a second adjustment coefficient based on a second pressure value at the touch point of the sliding operation; and controlling a moving distance of the visual field of the game scene on the graphic user interface according to the second adjustment coefficient, wherein the moving distance of the visual field of the game scene is derived by multiplying the moving distance of the sliding operation by the second adjustment coefficient.

17. The device according to claim 13, the processor is further configured to implement:
when it is detected that the touch point leaves the touch operation area and the preset boundary area, resetting a rendered view of the game scene on the graphic user interface.

18. The device according to claim 13, wherein the processor configured to implement controlling the visual field movements of the game scene on the graphic user interface according to the first sliding direction is further configured to implement:
detecting a second sliding direction of a touch point within the preset boundary area in a preset direction; and
controlling the visual field movement of the game scene on the graphic user interface according to superposition of the first sliding direction and the second sliding direction.

* * * * *